119,356

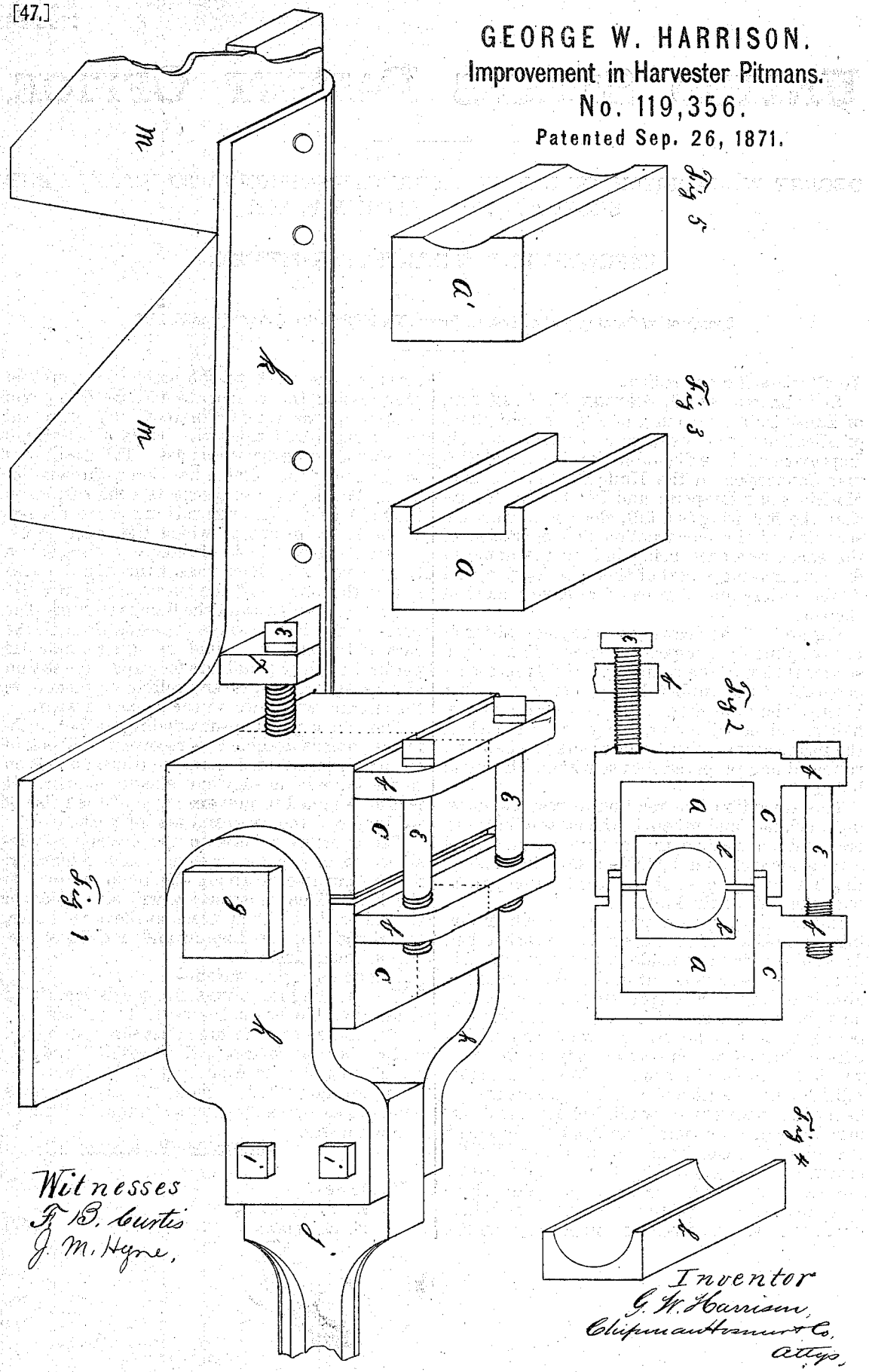
GEORGE W. HARRISON.
Improvement in Harvester Pitmans.
No. 119,356.
Patented Sep. 26, 1871.

UNITED STATES PATENT OFFICE.

GEORGE W. HARRISON, OF LANSING, MICHIGAN, ASSIGNOR TO HIMSELF AND SIMON FORSTER, OF SAME PLACE.

IMPROVEMENT IN HARVESTER-PITMEN.

Specification forming part of Letters Patent No. 119,356, dated September 26, 1871.

*To all whom it may concern:*

Be it known that I, GEORGE W. HARRISON, of Lansing, in the county of Ingham and State of Michigan, have invented a new and valuable Improvement in Adjustable Rubber-Lined Pitman-Connection to the Knife-Heel of Mowing-Machines and Reapers; and I do hereby declare that the following is a full, clear, and exact description of the construction and operation of the same, reference being had to the annexed drawing making a part of this specification, and to the letters and figures of reference marked thereon.

Figure 1 of the drawing is a representation of my coupling in perspective view. Fig. 2 is a sectional view of the coupling. Fig. 3 represents one-half of the rubber lining, being a rubber block of the form shown. Fig. 4 represents one-half of the metal lining, being a metal block of the form shown. Fig. 5 represents one-half of a rubber lining prepared for use without the metal lining.

This invention has relation to reapers, mowing-machines, and others of the class of harvesters; and it consists in the construction and novel arrangement of an adjustable rubber-lined coupling for the purpose of connecting the pitman with the heel of the knife.

In the drawing, $a$ $a$ represent the rubber linings or blocks, which are similar to each other. This rubber lining is made in two parts to facilitate its introduction within the iron boxes $c$ $c$; also, in order that when pressed together, as they must be, there will not be any slack of rubber between the two boxes. $b$ $b$ are the metal linings or blocks, which may or may not be used within the rubber linings $a$ $a$. When these metallic linings are used the rubber linings should be made in the form shown in Fig. 2 of the drawing; but when the metal lining is not to be used the rubber blocks should be made but slightly concave, as shown at Fig. 5, $a'$. $c$ $c$ represent the iron boxes, above referred to, one of which it is preferable to cast as a part of the knife-heel $k$. $e$ $e$ represent screw-bolts for securing the box $c$ nearest the knife to the other box $c$, and for compressing the rubber around the bolt $g$ and regulating the tension thereof. $f$ $f$ represent iron flanges cast upon the boxes $c$ $c$, through which the screw-bolts $e$ $e$ pass. The flanch $f$ of the box next the pitman has screw-threads cut in the bolt-holes. $x$ represents a lug cast upon the knife-heel. Through this lug passes the set-screw $e'$, by means of which the pressure between the boxes $c$ $c$ is effected. $g$ represents a large pivot-bolt which passes through the ears $h$ $h$ of the stirrup of the pitman, and also between the boxes $c$ $c$ and the linings thereof. The parts of the bolt $g$ where it passes through the ears of the stirrup should be square, and the perforations in the said ears for its passage should also be square, to prevent rolling or turning in the stirrup, which would cause useless wear.

The rubber-packing surrounding the bolt within the joint is designed to receive the shock of the driving mechanism, and to transmit motion to the knife in an easy and elastic manner. It is also designed to prevent much of the noise of working and the wear and tear of parts.

The aperture $z$, between the boxes $c$ $c$, is designed to be oblong or elongated horizontally, for the purpose of giving the requisite play to the bolt. This construction will also admit of the rubber being compressed at the outer edges, thereby giving the dipping and horizontal motion so much desired.

I claim as my invention—

The coupling for harvesters, consisting of the inner movable box $c$, the outer box $c$ attached to the knife-heel, the lug $x$, set-screw $e'$, bolt $g$, and rubber blocks $a$ $a$, with or without the metallic linings $b$ $b$, substantially as specified.

In testimony that I claim the above I have hereunto subscribed my name in the presence of two witnesses.

GEORGE W. HARRISON.

Witnesses:
A. E. COWLES,
E. B. WOOD.

(47)